United States Patent
Dhuna

(10) Patent No.: US 8,423,000 B2
(45) Date of Patent: Apr. 16, 2013

(54) GUARDIAN SYSTEM FOR A COGNITIVELY-IMPAIRED INDIVIDUAL

(76) Inventor: Anil Dhuna, Burlington, IA (US)

( * ) Notice: Subject to any disclaimer, the term of this patent is extended or adjusted under 35 U.S.C. 154(b) by 313 days.

(21) Appl. No.: 12/729,305

(22) Filed: Mar. 23, 2010

(65) Prior Publication Data
US 2011/0237226 A1 Sep. 29, 2011

(51) Int. Cl.
- H04M 3/42 (2006.01)
- H04W 24/00 (2009.01)
- H04B 7/00 (2006.01)
- G08B 1/08 (2006.01)
- G08B 1/00 (2006.01)
- G04B 47/00 (2006.01)
- G04B 47/06 (2006.01)
- A44C 5/00 (2006.01)

(52) U.S. Cl.
USPC .......... 455/414.1; 455/456.1; 455/456.3; 455/41.2; 340/539.12; 340/539.13; 340/539.15; 340/539.23; 340/539.11; 368/10; 368/281; 368/14

(58) Field of Classification Search ........... 607/1–78; 340/539.1–539.32; 455/414.1–414.4, 418–420, 455/456.1–456.6, 41.1–41.4; 368/1–14, 368/47, 107–109, 243, 244, 281–283
See application file for complete search history.

(56) References Cited

U.S. PATENT DOCUMENTS

| | | | |
|---|---|---|---|
| 5,349,338 A * | 9/1994 | Routman et al. | 340/692 |
| 6,443,890 B1 | 9/2002 | Schulze et al. | |
| 6,529,131 B2 * | 3/2003 | Wentworth | 340/573.1 |
| 6,944,542 B1 | 9/2005 | Eschenbach | |
| 7,486,194 B2 | 2/2009 | Stanners et al. | |
| 8,040,219 B2 * | 10/2011 | Haartsen et al. | 340/8.1 |
| 8,059,491 B1 * | 11/2011 | Hennings-Kampa | 368/14 |
| 2003/0208113 A1 * | 11/2003 | Mault et al. | 600/316 |
| 2006/0215495 A1 | 9/2006 | Soled et al. | |
| 2007/0021269 A1 | 1/2007 | Shum | |
| 2007/0093786 A1 | 4/2007 | Goldsmith et al. | |
| 2008/0081611 A1 * | 4/2008 | Hoyt et al. | 455/425 |
| 2008/0101160 A1 | 5/2008 | Besson | |
| 2009/0180355 A1 | 7/2009 | Cartwright | |

(Continued)

FOREIGN PATENT DOCUMENTS

| | | | |
|---|---|---|---|
| EP | 1 575 010 A1 | 9/2005 | |
| EP | 2 051 149 A2 | 4/2009 | |

(Continued)

OTHER PUBLICATIONS

State of Technology in Aging Services; www.aahsa.org/article_cast.aspx?id=6426; Jan. 24, 2010; pp. 2-14.

(Continued)

Primary Examiner — Matthew Sams
(74) Attorney, Agent, or Firm — Zarley Law Firm, P.L.C.

(57) ABSTRACT

A guardian system for cognitively-impaired individuals. The system includes a wrist phone system that has a display, a global positioning system, and a SIM card. The wrist phone system is tethered to a PDA phone so that the PDA phone is able to input information into the wrist phone system. In addition, the PDA phone and wrist phone system can communicate with one another and with monitoring devices such that if a warning or emergency condition is provided by the individual or by a monitor a warning message can be sent to a caregiver to address the emergency.

22 Claims, 2 Drawing Sheets

U.S. PATENT DOCUMENTS

2009/0223546 A1     9/2009    Nazarian
2009/0231960 A1     9/2009    Hutcheson
2009/0322513 A1    12/2009    Hwang et al.

FOREIGN PATENT DOCUMENTS

WO     WO 2005036487 A2     4/2005
WO     WO 2007069890 A1 *   6/2007
WO     WO 2010005406 A1     1/2010

OTHER PUBLICATIONS

Aerotel Medical Systems (1998) Ltd.; Personal Communicator with Distress Alarm and GPS Location; www.aerotel.com/en/products-solutions/lifecare-mobile-solutions/geoskeeper.html; GeoSkeeper; Jan. 17, 2010; pp. 1-4.

Powersmat USA; Mats; Jan. 20, 2010; www.powersmat.com/us/mats.html.

LIGHTINTHEBOX.COM; Wholesale Watch Cell Phone; www.lightinthebox.com/wholesale-Watch-Cell-Phone_c1298; Jan. 17, 2010; pp. 1-4.

LOK8U; LOK8U Introduces Multi-M8, A New GPS Locator Watch for Adults Who Work Alone, At Risk Seniors and Sports Participants, at CES 2010; www.lok8u.com/us/why-num8; Las Vegas & Birmingham, England; Jan. 7, 2010.

InfoSync; Samsung wrist watch phone later this year; www.infosyncworld.com/news/n/3338.html; Jan. 22, 2010.

Overclockers HQ LG Watch Phone; overclockershq.com/latest/lg-watch-phone.html; pp. 1-2; Jan. 22, 2010.

MOBILEWHACK.COM; May 22, 2008 CECT wrist watch phone for the geek in you; www.mobilewhack.com/cect-wrist-watch-phone-for-the-geek-in-you/; Jan. 22, 2010; pp. 1-2.

SimplyHome Product Offerings; The Business of Home Health Technology; Sep. 2009; Asheville, North Carolina.

* cited by examiner

GUARDIAN SYSTEM FOR A COGNITIVELY-IMPAIRED INDIVIDUAL

BACKGROUND OF THE INVENTION

This invention relates to a guardian system for monitoring an individual. More specifically, this invention relates to a system that is used by a cognitively-impaired individual, such as an Alzheimer patient, that both monitors and assists the patient with day-to-day activities.

There are an estimated 35.6 million people worldwide with dementia; this figure is estimated to double to 66 million by 2030 and reach 115 million by 2050. These increases will be especially prevalent in low and middle-income countries. These numbers are increasing primarily due the rapid aging of the world population and will have enormous impact on all societies. The slow regression of the individuals' cognitive abilities is one of the main causes of disabilities in the elderly. Dementia's long duration causes an average of ten years of disability in the general population, whereas heart disease causes less than five years and cancer causes less than four years. Dementia has a major impact on independent living. In developed countries, cognitive decline is often the precipitant for institutional placement, whereas people with quite severe physical impairment may continue to live at home with in home care. It is important to note that as much as three-quarters of nursing home residents have dementia.

The financial burden is difficult enough for high-income countries, but with the epidemic hitting low and middle-income countries (particularly in Asia) there may be potentially unmanageable societal costs. Presently, these countries have relied on extended family support to keep these individuals at home. But with the children of the cognitively impaired and their spouses working and grandchildren studying away from home this practice is becoming less commonplace. In the next 10-15 years, the initial bubble of dementia will be arriving. There is a need to keep these individuals at home with families or alone during the mild to moderate stages.

The early to moderate stages of dementia last from three to eight years, with the major initial cognitive deficit being short-term memory loss. These individuals are physically able to do tasks in the home, such as dressing, taking medicine, simple cooking, and bathing, but they need reminders due their memory loss. They also do better in their own homes with its familiar surroundings. This environment is reassuring for because these surroundings are retained in the memory of the individual until the later stages of the disease when long-term memory is lost. If these individuals could be maintained in their own homes, even for an additional 1-2 years before assisted living or nursing home placement, the savings to the individual and society would be enormous. Nursing home care in high-income countries can range from $2,500 up to $6,000/month; delaying placement even by 1 to 2 months would pay for the costs for this invention. This does not include the significant decrease in family's stress and improved patient safety provided by this device. The cost for dementia care ranges from $1,500 in low-income countries to $17,000 in high-income countries.

High-income countries are developing sophisticated monitoring devices for smart homes and remote monitoring that may be able to keep these individuals in their homes longer. But what is needed is a more cost efficient alternative that individuals in low and middle-income countries can afford with readily available technology and infrastructure already in place.

Therefore, a need exists for a scalable, inexpensive system that provides basic monitoring, reminders, and safety features. There is also a need for a system that is able to be used in an emergency by pressing an alarm button, and in the late stages of dementia, when the individual does not remember how to press the alarm button, monitors vital body signals (heart rate, falls, oxygen saturations, etc.) for health. The system should also be able to locate the individual in the home. In the event that the individual becomes lost outside the home the system should be able to locate them by GPS and communicate with them for reassurance and directions back to the home.

Thus, a principal objective of the present invention is to provide a cost-efficient guardian system for a cognitively-impaired individual.

Another objective of the present invention is to provide a guardian system for an individual that is easy to use and aesthetically pleasing.

Another objective of the present invention is to provide a guardian system for an individual that assists caregivers and the patient with their disease.

These and other objectives, features, or advantages of the present invention will become apparent from the specification and claims.

BRIEF SUMMARY OF THE INVENTION

A guardian system for a cognitively-impaired individual. The system has a wrist phone system with a display, global positioning system, and an identifying device that communicates with a mobile network. A personal digital assistant phone is tethered to the wrist phone system to communicate with the wrist phone system and to provide input to program the wrist phone system. A warning message is sent to a receiving device based on communications provided by the guardian system.

DETAILED DESCRIPTION OF THE PREFERRED EMBODIMENT

Figure 1:
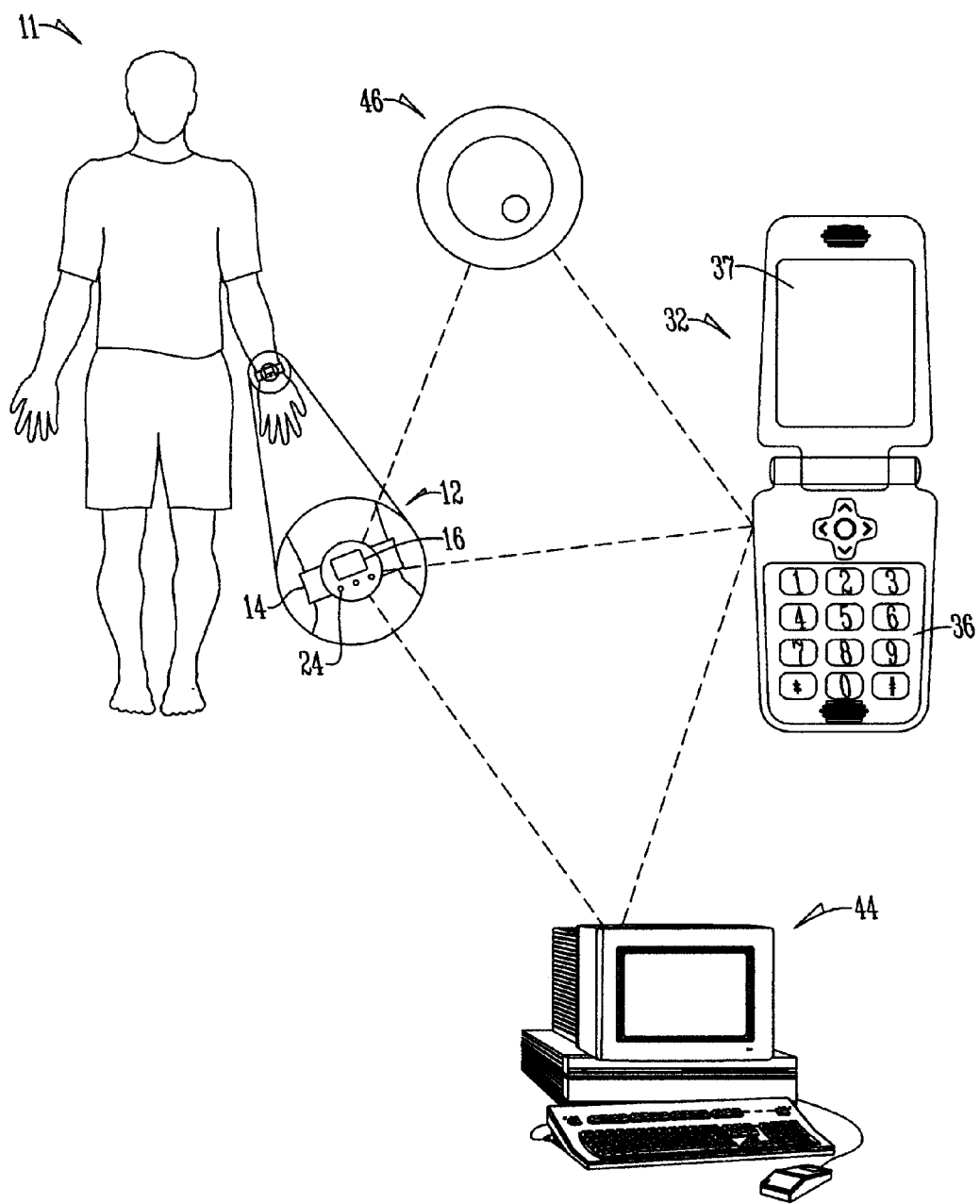
FIG. 1 is a perspective view of a guardian system for a cognitively-impaired individual.
Figure 2:
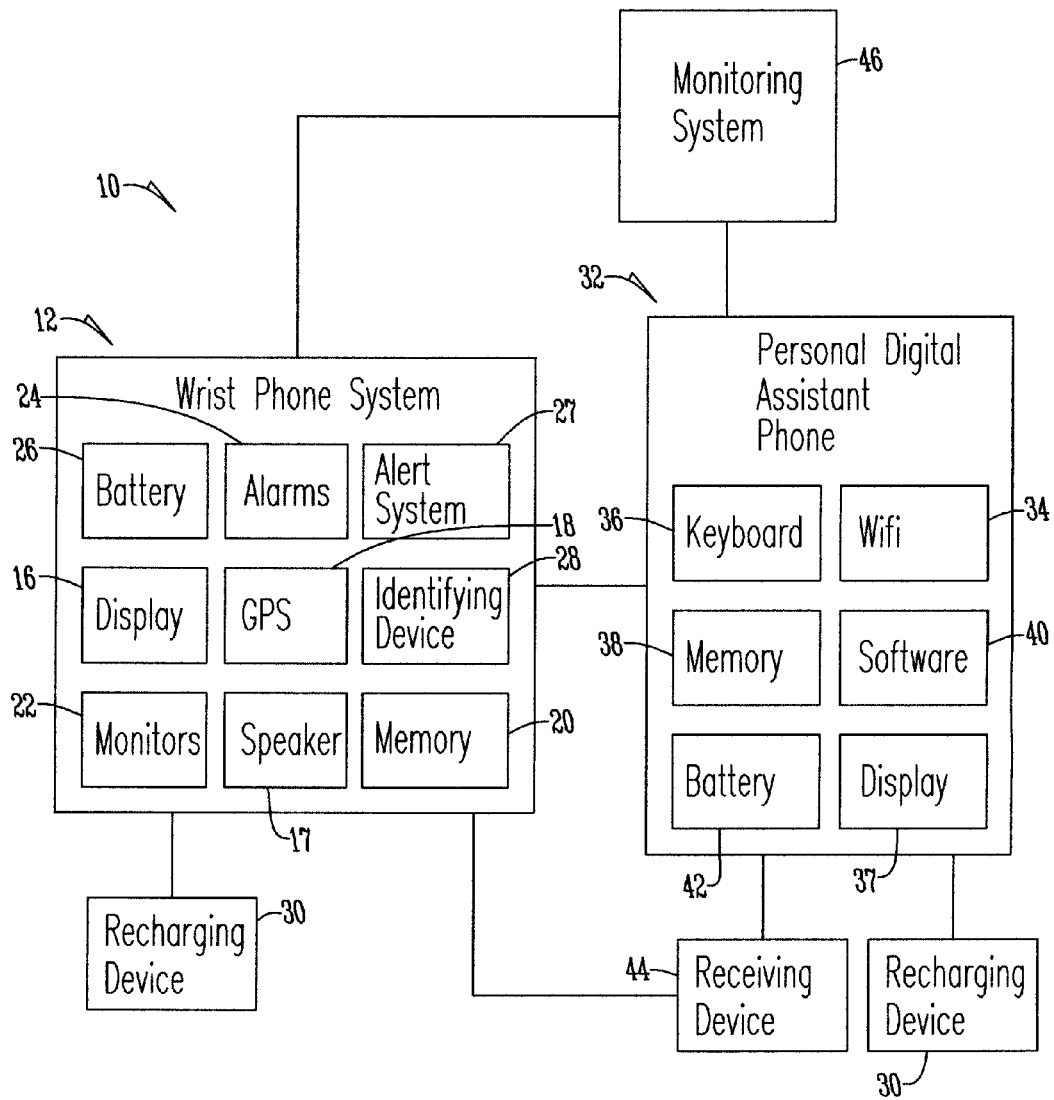
FIG. 2 is a schematic diagram of a guardian system for a cognitively-impaired individual.

The figures show a guardian system 10 for a cognitively-impaired individual 11 such as an Alzheimer patient. The guardian system 10 includes a wrist phone system 12 that is held by an adjustable strap or bracelet 14 and is made of a hypo-allergic material so that it may be worn continuously. In an alternate embodiment, the wrist phone system 12 is additionally waterproof and shockproof. Similarly, while illustrated as on an individual's wrist, the wrist phone system 12 similarly can be attached to or part of a necklace, ankle bracelet, a band, or the like.

The wrist phone system 12 additionally has a display 16, a speaker 17, a global positioning system (GPS) 18, a memory 20, monitors 22 such as a heart monitor, alarms 24 and a battery 26. The wrist phone system 12 also has an alert system 27 that in a preferred embodiment is an auditory alert system that uses either an alarm or a verbal command to be heard by the individual 11. In a preferred embodiment, the verbal command is provided by an individual known to the individual such as a loved one, caregiver, or the like. The wrist phone system 12 also has an identifying device 28. In a preferred embodiment, the identifying device 28 is a subscriber identity module card that is also known as a SIM card. Typically, a SIM card is associated with a global system for mobile communications or GSM and alternatively can be associated with a code division multiple access system or CDMA.

The wrist phone system 12 may be recharged using a recharging device 30 in order to recharge battery 26. In a preferred embodiment, the recharging device is a magnetic induction power mat. Alternatively, the wrist phone system 12 is recharged with a recharging device via a DC plug, such as a corded recharger with an adapter which plugs into a wall outlet, and the like.

A personal digital assistant phone (PDA phone) 32 is linked and tethered to the wrist phone system 12 to provide a communication path between the wrist phone system 12 and PDA phone. The PDA phone 32 does not have an identification device such as a SIM card and instead uses the identifying device 28 in the wrist phone system 12 so that cellular calls can be made using the PDA phone 32. Although functionally a PDA phone 32, the features and appearances of the PDA phone 32 are like a cell phone to make it easy for the individual 11 to use for calls, texting, information, calendars, reminders and the like. To that end, the PDA phone 32 is designed similar to a jitterbug device that utilizes large buttons, display, has a loud speaker and has simple menus.

The wrist phone system 12 can be programmed by the PDA phone 32 to do auditory alarms or repeat recorded voice files for reminders such as for meals and medication. The PDA phone 32 can even display a picture of a family member, location of the task, i.e., kitchen for meals or medications and what the medication box should look like and time/day of the medication to be taken.

In one embodiment the PDA phone 32 is tethered to the wrist phone system 12 by Bluetooth whereas in another embodiment the wrist phone system 12 is tethered to the PDA phone 32 via a personal area network (PAN) using wi-fi 34. Thus, the PDA phone 32 is the primary device to allow programming of the wrist phone system 12. The PDA phone 32 has a keyboard 36 and a display 37 so that one can toggle between the PDA phone 32 or wrist phone system 12 such that the PDA phone can be used to set up the alarms 24, alert system 27, reminders, contact list or the like for the wrist phone system 12. To that end, the PDA phone 32 can display text received by the wrist phone system 12 to allow entry in sending of text either by wi-fi and internet or by SMS.

The PDA phone 32 additionally has a memory 38 that acts as a backup memory for the wrist phone system alarms 24, reminders and additionally is used to log the activity of heart rate from the monitor 22 for 24 hours. The PDA phone 32 also has software 40 that can be programmed by a personal computer when tethered by a Bluetooth. The PDA phone can have its software 40 upgraded by an IT service center or a website can be manufactured by family caregivers. The PDA phone 32 also has a battery 42 or other power means to provide power for operation. In addition the PDA phone may use the same or similar rechargeable battery 30 as the wrist phone system 12.

The wrist phone system 12 and the PDA phone 32 both in communication with a receiving device 44 via over the air communication. In one embodiment the receiving device 44 is a computer at an information technology (IT) center that monitors messages from the PDA phone 32. In an alternative embodiment the receiving device 44 is a cellular phone of a caregiver that receives both text and auditory communications. Thus, the wrist phone system 12 and PDA phone 32 are able to send warning messages to the receiving device 44 based on communications within the system 10 such as when an individual 11 wearing the wrist phone system 12 presses a recessed alarm button that activates an alarm 24 to allow the caregiver to know an issue is presented. Similarly, if the PDA phone 32 loses connection with the wrist phone system 12, notification can be sent to the receiving device 44 of the disconnection by wi-fi and PAN. In an alternative embodiment the wrist phone system 12 can have some of the functions of the PDA phone 32 such as wi-fi 34, software 40, or even sensors of the monitoring system 46.

The wrist phone system 12 and personal digital assistant phone 32 are additionally in communication with a monitoring system 46 via over the air communication, Bluetooth or other communication path. In one embodiment the monitoring system is a fire or smoke alarm while in other embodiments the monitoring system 46 is a Carbon Monoxide monitor (CO), an appliance, light controls, or sensors on medication dispensers. In another embodiment the software 40 of the PDA phone 32 can be set up for locating the individual 11 in real time so that the monitoring system 46 is a personal locater such as Bluetooth locators in the home, wherein monitoring the location of the individual 11 is achieved by tracking the wrist phone system 12 by Bluetooth.

For security purposes, the wrist phone system 12, if connected to wi-fi to PAN and/or PDA phone 32 can be programmed or integrated by the internet with a specific IP address that utilizes a secure password encryption so that information can be provided privately. In one embodiment the PDA phone 32 only operates when in close proximity or alternatively tethered to the wrist phone system 12. When not tethered the wrist phone system can only be used upon entry of a personal identification number (PIN) by the individual 11.

In operation, an individual 11 wears the wrist phone system 12 that is in communication with the PDA phone 32 wherein the PDA phone 32 is also in communication with a receiving device 44 and a monitoring system 46. The GPS 18 of the wrist phone system 12 presents a continuous location of the individual 11. The wrist phone system 12 is designed such that all measures are taken to ensure that battery life is conserved, including but not limited to placing the GPS 18, wi-fi 34 and/or identifying device 28 such as a SIM card in standby mode. The wrist phone system can be activated from standby mode, such as when the wrist phone system 12 fails to detect the PDA phone 32 by Bluetooth or wi-fi 34, fails to detect a home PAN by wi-fi, the wrist phone system 12 leaves a preset GPS zone, an alarm button 24 is pressed or the wrist phone system 12 receives a cellular call. The monitor 22 of the wrist phone system 12 monitors the current state of the individual 11 such as monitoring heart rate and the like. The monitoring system 46 can indicate things such as whether the individual 11 is taking medication or if an emergency situation such as a fire or the like is occurring.

Thus, a plurality of safety checks is presented for the individual 11. Specifically, if the individual 11, as indicated by the GPS 18, wanders outside of a known zone for the patient 11, the wrist phone system 12 can communicate by GSM/CDMA SIM and SMS to a receiving device 44 of a caregiver or IT service center to inform the caregiver or service center that the individual 11 needs assistance. Simultaneously, the wrist phone system 12 can activate its alert system 27 to provide an auditory voice message from an individual known to the individual 11 in order to try to remind them to go back to their home or instruct them to ask for help because they are lost. Alternatively, the family caregivers or IT service center can contact the individual 11 on the wrist phone system 12 to talk with the individual on the wrist phone speaker 17. There is no need to press a button to receive the call.

Another safety check occurs in that the wrist phone system 12 has an alarm 24 that can be a recessed alarm button that when pressed by an individual 11 places an emergency call via the wrist phone system 12 GSM/CDMA SIM and SMS to the receiving device 44 to a caregiver or IT service center. Another safety check is provided by the monitor 22 of the wrist phone system 12 that can determine vital functions of the individual 11 such as heart rate such that if the heart rate is erratic or shows potential danger again the wrist phone system 12 can communicate either by the wrist phone system 12 GSM/CDMA SIM and SMS and/or the PDA phone 32 to provide this information to the receiving device 44 for the caregiver or IT service center to monitor. The patient's heart can be monitored by an algorithm and if it drops below or above preset parameters where there is a rapid rate change and alert is sent by the wrist phone and an IT service center where a caregiver can assess the heart rate real time and communicate with the patient. Thus, in one embodiment, the wrist phone 12 system's primary method to communicate with the receiving device 44 of a caregiver or an IT center is via the phone system's 12 SIM. In another embodiment, such communication between the wrist phone 12 system and caregiver/IT center is additionally achieved via the wi-fi 34 over a PAN or, alternatively, by utilizing the PDA phone 32 linked to the wrist phone 12 to connect by wi-fi 34 over a PAN.

An additional safety check occurs in that the memory 20 of the wrist phone system 12 is communicated to the memory 42 of the PDA phone 32 and is able to store the memory for several days so that several days worth of memory may be sent to the receiving device 44 such that a caregiver or IT service center can ensure that the pattern of activity of the individual 11 is normal and does not indicate an emergency condition is presented. Another safety check is provided using the monitoring system 46 and provides communication to the PDA phone 32 regarding safety issues such as smoke and Carbon Monoxide (CO) alarms, appliances, sensors associated with medical dispensers and the like to indicate when a dangerous or emergency condition may be presented that again can be communicated to the caregiver or IT service center via the receiving device 44.

Another check provided is that the wrist phone system 12 is monitored for breakage or faulty communication and if the straps or bracelet 14 are removed can send an alert to the IT service center or caregiver. Similarly, when the battery 42 of the PDA phone 32 is low there is an auditory alert using the alert system 27 so that the individual 11 recharges the PDA phone system 32 on the recharging device 30. If the battery is low on the wrist phone system 12 the system 12 can send an auditory alert using the alert system 27 so that the individual 11 will recharge the wrist phone system 12 on the recharging device 30. At the same time, communication such as a text can be sent to caregivers or alert an IT service center that the wrist phone system 12 has a low battery. The recharging device 30 can be a magnetic induction (Power Mat) for the waterproof wrist phone or by a DC plug.

Thus, provided is a guardian system 10 for an individual 11 that provides multiple monitoring and safety systems for an individual to use so that caregivers can monitor the activities of the individual 11. The system utilizes only a single SIM card or identifying device 28 for both a wrist phone system 12 and a PDA phone 32 that minimizes both the complexity and the cost of the system. The system 10 utilizes current technologies such as Bluetooth, wi-fi and the like to provide an easy to use system for elderly individuals that not only provides multiple safety features for the individuals but additionally consumes little power so that the need to recharge or replace batteries on the device is minimized.

Additional advantages include that the wrist phone system 12 is both shock proof and waterproof and utilizes a low powered usage display 16 for watch and digital or electronic format to be used continuously by the individual 11. The wrist phone system 12 is made of a hypo-allergic material so that it may be worn continuously. The wrist phone system 12 can also include alarms 24 such as an alarm that indicates when the watch is removed so that a caregiver or IT service center may be alerted upon removal of the wrist phone system 12.

The wrist phone system 12 also presents alarms 24 that can provide reminders either through auditory beeps, vibration, text on display, or verbal recordings from familiar family/caregivers regarding reminders such as getting medication, taking a shower, or the like. Similarly, voice messages can urge a loved one to go back to a home when lost or to leave a home when a dangerous situation is detected as a result of the GPS 18 or monitoring system 46 or the like. The wrist phone system 12 is linked by Bluetooth by the PDA phone 32 such that the keyboard of the PDA phone 32 acts as the keyboard for the wrist phone system 12. Similarly, the PDA phone 32 provides display and backup memory 38 and computing/software 40 so that such features do not need to be presented in the wrist phone system 12 thus minimizing the cost of the wrist phone system 12. Also saving on cost is the fact that because of the PDA phone 32 there is no need for a LCD display or a large memory for the wrist phone system 12. The wrist phone system 12 can be further miniaturized and battery-life extended as a result of the PDA phone 32 providing functionalities for the wrist phone system 12.

In addition, the system uses a Bluetooth SIC, low energy consumption configuration. This allows the wrist phone system 12 to be tethered to the PDA phone 32 and other sensors used in a monitoring system 46. To this end, the monitoring system 46 can be an optional heart rate monitor or alternatively the wrist phone system 12 itself can have a monitor 22 to detect stressful and medically dangerous heart rate changes.

The software 40 is set up for normal parameters for patient's routine in-home and if significant deviation is sensed, an alert can be sent to the receiving device 44. To this end, the caregivers or IT service center having the receiving device can download several days of memory from the PDA phone 32 to analyze if problems occur or for preventive monitoring for unusual trends.

If there is a loss of internet connection, again, a signal can be sent by the wrist phone system identification device 28. The PDA phone 32 can be programmed or integrated by the internet with its specific IP address and using a secure password encryption.

Thus, the system 10 is designed for an individual 11 that is still at home to provide 24/7 monitoring and keep the individual in their own home. The system allows the caregivers to maintain patient comfort, independence and safety while minimizing physical time and expense in performing these tasks. The caregivers can instead focus on assistance to keep the patient in their home in order to save major cost in moving the patient to an assisted living or nursing home facility. The system 10 presents a non intrusive manner to assess the patient in the home and can be utilized to call for help from anywhere in the home or outside with cellular coverage, monitor the patient's health, to monitor the patient's daily routine, and if the patient were to leave the home to redirect them back to the home or to locate them. The system is easy to set up, robust, and easy to use by caregivers and at an affordable cost.

The system also acts as an alarm system because the patient can press the wrist phone system alarm button to get immediate help. The call goes by wrist phone to a family caregiver or IT service center. If no cellular signal is provided then the wrist phone can send an alarm by wi-fi over PAN to the IT service center or family caregivers. The family caregiver or IT service center also has the individual's heart rate and location in the home available.

The system also allows passive monitoring for safety. If the individual leaves the home without informing the IT service center or family caregivers, when the wrist phone is out of range of the PAN or leaves a preset GPS zone, then an alarm will be sent by both the PDA phone 32 by VoIP to the IT service center and the wrist phone by GSM/CDMA SIM and SMS. The wrist phone can be located by the GPS coordinates. If the patient is indoors and there is no GPS signal can be detected, the wi-fi will try to connect to an available network to send the message to the IT service center to help locate the patient.

The patient location in the home can be monitored with Bluetooth locators in a WPAN and analyzed with sophisticated software for unusual situations, i.e., patient in kitchen for several hours without movement indicating perhaps a fall, or erratic awakenings at night and wandering around home, or not gone to medication area despite reminders or the like. These could result in an alert to the family caregiver or IT service center by the PDA phone and could be archived and reviewed by family caregivers or IT service center or health professionals. The PDA phone 32 can be tethered to monitoring systems 46 such as smoke/fire detectors, bed sensors, burglar alarms, medication dispensers and the like. If the monitoring systems are activated then an alarm is sent to the family caregiver, emergency service or IT service center. If no internet connection is provided then a message can be sent via wi-fi/Bluetooth connection to the wrist phone which is then sent by the identifying device such as the SIM card.

Thus, the system provides a locator and has an advantage over landline alert systems that are not able to locate more than 200 feet from a base by GPS. While wi-fi alarms exist, they are limited by known GPS or cellular technology and are limited if the patient leaves the home. In addition, other GPS locators do not have cellular phone capabilities. Further, the latest generation of wrist phones are too complicated to be able to use by a patient group such as an individual 11 who are elderly, cognitively impaired, have limited vision and dexterity and lack familiarity of electronic devices. Specifically, the wrist phone system 12 is not complicated to use having only one alarm button and additionally has long battery life and is tethered to the PDA phone 32. Because only one identifying device such as a SIM card is used between the wrist phone and the PDA phone expense is decreased, use is simplified, and components eliminated. Because the PDA phone 32 acts as the wrist phone system 12 keypad and input device for alarms, reminders, contacts and auditory recording, the complexity of the wrist phone system is minimized. The device can recharge using magnetic induction, or, alternatively, via a DC plug. It can connect to other Bluetooth sensors in the home including heart rate monitoring for patient safety. The GPS provides location of the individual if lost and leaves confines of the home and can help redirect them via family caregivers.

The wrist phone is simplified to the most basic device for the individual which is a wrist phone that can be worn on an individual's arm. Still the system presents a sophisticated means to monitor unobtrusively the patient's vitals and location. Thus, if a family or caregivers are concerned they have immediate ability to talk to the patient. Additional auditory reminders via alarms or recordings by familiar family voice for medication, meals and IDLs improve safety and well being. The tethered PDA phone is familiar to the elderly patient and much easier to use than wrist phone controls. However, checks are in place so that if individuals with cognitive and physical conditions worsen, and are not able to use the PDA phone, they can instead use the alarm on the wrist phone system 12, the GPS locator, the heart rate monitor and the like and other Bluetooth sensors for such conditions. The system 10 can be used at all times without taking it off for showers because it is hypo-allergic, waterproof and shockproof. To that end, an alarm can be set off if the wrist phone system 12 is removed from an individual's wrist such as a sensor to determine when a buckle is undone. The alarms and auditory reminders are for a low battery and charge with magnetic induction. Thus, this is less complicated for the elderly so that they can simply lay the device on top of the induction mat without having to attach wires. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A guardian system for a cognitively-impaired individual comprising:
   a wrist phone system having a global positioning system and an identifying device that communicates with a mobile network;
   a personal digital assistant phone tethered to the wrist phone system to communicate with and to provide input to program the wrist phone system to record voice files that are repeated as reminders for meals and medication and display a picture of a location for the meal and medication tasks;
   wherein a warning message is sent to a receiving device based on communications within the guardian system;
   wherein a warning message is sent to the receiving device in response to the individual's location determined by the global positioning system;
   wherein when the cognitively-impaired individual wearing the wrist phone system strays beyond a boundary area the wrist phone system provides instructions to the cognitively-impaired individual how to return to the boundary area.

2. The system of claim 1 wherein the identifying device is a subscriber identity module.

3. The system of claim 2 wherein the subscriber identity module is associated with a global system for mobile communications.

4. The system of claim 2 wherein the subscriber identity module is associated with a code division multiple access system.

5. The system of claim 1 wherein the personal digital assistant phone is tethered to the wrist phone system via Bluetooth.

6. The system of claim 1 wherein the personal digital assistant is tethered to the wrist phone system via a personal area network using wi-fi.

7. The system of claim 1 wherein the receiving device is a computer at an information technology service center.

8. The system of claim 1 wherein the receiving device is a cell phone of a caregiver.

9. The system of claim 1 wherein the wrist phone system has an auditory alarm.

10. The system of claim 9 wherein the auditory alarm provides a voice of an individual known to the individual.

11. The system of claim 1 wherein the wrist phone system is waterproof.

12. The system of claim 1 wherein the wrist phone system is shockproof.

13. The system of claim 1 wherein the global positioning system and identifying device have standby modes.

14. The system of claim 1 wherein the personal digital assistant phone does not have a separate identifying device from the wrist phone system.

15. The system of claim 1 further comprising a monitoring system that provides the communications that the warning message is based upon.

16. The system of claim 15 wherein the monitoring system is a heart monitor.

17. The system of claim 15 wherein the monitoring system is associated with medication taken by the individual.

18. The system of claim 15 wherein the monitoring system is a personal locater for the individual in a home.

19. The system of claim 18 wherein the personal locater is a Bluetooth locator that monitors the location of the individual.

20. The system of claim 1 wherein the receiving device accesses a memory to monitor the individual's behavior.

21. The system of claim 1 wherein the personal digital assistant phone uses the identifying device of the wrist phone system to make cellular calls and the wrist phone system communicates with a receiving device via the identifying device such that the guardian system utilizes a single identifying device for both the wrist phone system and the personal digital assistant phone.

22. A guardian system for a cognitively-impaired individual comprising:
- a wrist phone system having a global positioning system and an identifying device that communicates with a mobile network;
- the wrist phone system also has a sensor that senses when the wrist phone system is removed from the cognitively-impaired individual;
- a personal digital assistant phone tethered to the wrist phone system to communicate with and to provide input to program the wrist phone system to record voice files that are repeated as reminders for meals and medication and display a picture of a location for the meal and medication tasks;
- wherein a warning message is sent to a receiving device based on communications within the guardian system;
- wherein when the wrist phone system is removed from the cognitively-impaired individual the wrist phone system sends a warning message to the receiving device indicating that the wrist phone system has been removed;
- wherein the wrist phone system has an alarm button that when activated causes the warning message to be sent.

* * * * *